(12) United States Patent
Jang et al.

(10) Patent No.: US 8,043,768 B2
(45) Date of Patent: Oct. 25, 2011

(54) LIQUID TANK USING FUEL CELL SYSTEM AND LIQUID LEVEL DETECTION DEVICE

(75) Inventors: Won Hyouk Jang, Yongin-si (KR); Hyung Keun Lee, Seoul (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1250 days.

(21) Appl. No.: 11/673,217

(22) Filed: Feb. 9, 2007

(65) Prior Publication Data
US 2007/0190388 A1 Aug. 16, 2007

(30) Foreign Application Priority Data
Feb. 10, 2006 (KR) .................. 10-2006-0013147

(51) Int. Cl.
*H01M 8/04* (2006.01)
*G01F 23/24* (2006.01)
(52) U.S. Cl. ................. 429/515; 73/304 R; 73/304 C
(58) Field of Classification Search ................. 429/515
See application file for complete search history.

(56) References Cited

U.S. PATENT DOCUMENTS

| 1,978,392 | A | * | 10/1934 | Von Brockdorff | .......... 73/304 R |
|---|---|---|---|---|---|
| 3,809,116 | A | | 5/1974 | Sanner | |
| 4,188,826 | A | * | 2/1980 | Kankura et al. | ............ 73/304 R |
| 4,213,339 | A | | 7/1980 | Shannon | |
| 4,244,385 | A | | 1/1981 | Hotine | |

FOREIGN PATENT DOCUMENTS

| CN | 1595694 | 3/2005 |
|---|---|---|
| FR | 2 298 194 | 1/1975 |
| JP | 64-057126 | 3/1989 |
| JP | 06-180244 | 6/1994 |
| JP | 11-023346 | 1/1999 |
| JP | 2004-206917 | 7/2004 |
| JP | 2005-129237 | 5/2005 |
| JP | 2005-310615 | 11/2005 |
| KR | 2002-56135 | 7/2002 |
| KR | 2005-25496 | 3/2005 |
| KR | 2005-56583 | 6/2005 |
| KR | 2006-107153 | 10/2006 |

OTHER PUBLICATIONS

Office Action issued in Korean Patent Application No. 2006-13147 on Jan. 31, 2007.
Office Action issued by the State Intellectual Property Office of the People's Republic of China on Mar. 28, 2008.

(Continued)

*Primary Examiner* — Patrick Ryan
*Assistant Examiner* — Brent Thomas
(74) *Attorney, Agent, or Firm* — Christie, Parker & Hale, LLP

(57) ABSTRACT

A liquid tank capable of detecting liquid level when the tank is rotated. The liquid tank includes an airtight vessel to store the liquid; and at least two electrodes installed inside the airtight vessel. The distal ends of the electrodes are positioned at a central volume of the airtight vessel. A fuel cell adopting the liquid tank maintains the liquid level in the tank near 50% of the full level even when the fuel cell is rotated.

21 Claims, 4 Drawing Sheets

OTHER PUBLICATIONS

Communication and Extended Search Report issued Jun. 27, 2007 by the European Patent Office re: European Application No. 07102036.6—2209 (7 pp).

Japanese Office action dated Aug. 17, 2010, for corresponding Japanese Patent application 2007-030543, noting listed references in this IDS.

Notice of Allowance issued in Korean Patent Application No. 2006-13147 dated Jul. 31, 2007.

Japanese Notice of Allowance dated Jul. 5, 2011, for corresponding Japanese Patent application 2007-030543, noting listed references in this IDS, as well as references previously submitted in an IDS dated Sep. 16, 2010, 1 page.

* cited by examiner

LIQUID TANK USING FUEL CELL SYSTEM AND LIQUID LEVEL DETECTION DEVICE

CROSS-REFERENCE TO RELATED APPLICATIONS

This application claims the benefit of Korean Patent Application No. 2006-13147, filed Feb. 10, 2006, in the Korean Intellectual Property Office, the disclosure of which is incorporated herein by reference.

BACKGROUND OF THE INVENTION

1. Field of the Invention

Aspects of the present invention relate to a liquid tank within a fuel cell system, and more particularly, to a liquid tank capable of detecting a liquid level even when the fuel cell system is rotated.

2. Description of the Related Art

In general, a fuel cell is a power generation system that directly converts chemical energy into electrical energy by the electrochemical reaction of hydrogen and oxygen. Hydrogen is supplied to the fuel cell by reforming methanol, ethanol, and natural gas, etc. Oxygen is generally supplied thereto from air by using an air pump, etc.

Fuel cells include polymer electrolyte fuel cells and direct methanol fuel cells operated at a temperature of about 100° C. or less, phosphoric acid fuel cells operated at about 150° C. to 200° C., molten carbonate fuel cells operated at high temperatures of about 600° C. to 700° C., and solid oxide fuel cells operated at higher temperatures of about 1000° C. or more, etc. These fuel cells generally operate to generate electricity in the same manner but are different in view of the types of fuels, catalysts, and electrolytes used, etc.

Among others, the direct methanol fuel cell (DMFC) uses a fuel that is a mixture of high concentration liquid methanol and water instead of using hydrogen as the fuel. The DMFC is lower in output density than fuel cells using hydrogen directly. However, the DMFC has a high energy density per volume of methanol used, and methanol fuel is easily stored. Also, the DMFC is well adapted to operate at a low output for a long time. Also, the DMFC can be compactly constructed because the DMFC needs no additional devices, such as a reformer to reform fuel to generate hydrogen, etc.

The DMFC includes a membrane electrode assembly (MEA) configured of a polymer electrolyte membrane to which an anode and a cathode are closely adhered to opposite sides. As a polymer electrode membrane, generally fluoropolymers are used. However, the methanol is rapidly soaked into the fluoropolymer membrane when the DMFC uses a high concentration of methanol as fuel causing a crossover phenomenon of transmitting non-reactive methanol to the polymer electrolyte membrane. Accordingly, in order to lower the concentration of methanol, the fuel mixture of methanol and water is supplied to the fuel cell system.

Meanwhile, the polymer electrolyte membrane fuel cell (PEMFC) uses hydrogen generated by reforming substances, such as methanol, ethanol, natural gas, etc., and has a remarkably high output, a low operating temperature, and rapid starting and response characteristics. Therefore, the PEMFC is widely applicable to transportable power sources, such as automobiles, as well as distributed power sources, such as houses or public buildings, etc., and as power sources for small mobile equipment, such as personal digital assistants (PDAs).

The PEMFC requires pure hydrogen to generate electricity. PEMFCs achieve this by using catalyst reactions, such as steam reforming (SR) and water gas shift (WGS), etc. PEMFCs also require the removal of carbon monoxide, which is a byproduct of the above hydrogen-generating methods and which poisons the catalyst of the fuel cell when included in the hydrogen.

For continuous operation of the fuel cell, the fuel mixture for both DMFCs and PEMFCs is continuously supplied. Thus, it is necessary to maintain the fuel mixture at a constant level. Generally, a conventional fuel cell includes a device to maintain the amount of the fuel in a tank at a predetermined liquid level that detects the amount of the fuel using, for example, ultrasonic waves, etc. However, the construction of such fuel cells is complicated, and the liquid level cannot be measured when the fuel cell is rotated.

SUMMARY OF THE INVENTION

Aspects of the present invention are addressed to the above problems. Aspects of the present invention provide a liquid level detection device capable of simply measuring the liquid level of a conductive liquid using two electrode bars, and more particularly, a liquid level detection device operable even when rotating.

According to an embodiment of the present invention, there is provided a liquid tank within a fuel cell system using a conductive liquid, including: an airtight vessel storing the liquid; and at least two electrodes installed inside the airtight vessel, the distal ends thereof being positioned at the central volume of the airtight vessel.

The airtight vessel may be a point symmetric shape at 180° with respect to the volume central point of the airtight vessel. The respective electrodes can be installed in point symmetry with respect to the volume central point of the airtight vessel and at conductible intervals when simultaneously immersed into the liquid. The respective electrodes are the same length, wherein some of the distal portions thereof can be overlapped. The overlapped portions of the respective electrodes can be included between the highest level and the lowest level of liquid stored in the airtight vessel.

The electrodes can be provided with an insulator covering all but exposed portions of the distal ends thereof. The lengths of the insulators installed on the electrodes may be in the range of over 40% to 50% or less of the full level of the airtight vessel. The electrodes can be installed in one direction and at conductible intervals when the exposed portions of the electrodes are simultaneously dipped into the liquid. The lengths of the electrodes are the same, wherein some of the exposed portions can be overlapped. The overlapped portions of the exposed portions of the electrodes can be included between the highest level and the lowest level of the liquid stored in the airtight vessel.

The electrodes can be vertically installed to the water surface of the liquid stored in the airtight vessel. The horizontal and vertical lengths where the distal portions of the exposed portions of the electrodes are overlapped may be below 10% of the length of the full level of the airtight vessel. The lengths of the exposed portions of the electrodes may be in the range of over 50% to below 60% of the length of the full level of the airtight vessel. The distal portions of the exposed portions of the electrodes are curved at 90° toward each other so that some thereof are overlapped and the vertical lengths of the electrodes may be in the range of over 50% to below 60% of the length of the full level of the airtight vessel. The distal portions of the electrodes are curved in a vortex shape to each other so that some thereof are overlapped and the vertical lengths of the electrodes may be in the range of over 50% to below 60% of the length of the full level of the airtight vessel.

Also, it may include a signal detector supplying electricity to the electrodes and detecting the switching of the electrodes.

According to another embodiment of the present invention, there is provided a liquid level detection device using a conductive liquid, including: at least two electrodes and a signal detector supplying electricity to the electrodes and detecting the switching of the electrodes.

According to another aspect of the current invention, the electrodes can be installed symmetrically about the central volume of the airtight vessel and at conductible intervals when simultaneously immersed in the liquid.

According to another aspect of the current invention, the electrodes are installed to extend in a first direction, and the first direction is normal to the surface of the liquid stored in the airtight vessel.

According to another aspect of the current invention, the electrodes extend in a second direction, perpendicular to the first direction, and lengths in which the distal ends of the electrodes overlap in the first and second directions are less than about 10% of the height of a full level of the airtight vessel.

According to another aspect of the current invention, a liquid level detection device using a conductive liquid is provided, including: at least two electrodes; an airtight vessel; and a signal detector to supply electricity to the electrodes and to detect a switching of the electrodes.

According to another aspect of the current invention, the switching of the electrodes is detectable as the electrodes either change from a state of electrical connection through the conductive liquid to a state of disconnection or change from a state of disconnection to a state of electrical connection through the conductive liquid.

According to another aspect of the current invention, a tank to contain a conductive fuel for a fuel cell is provided, including: a sealed housing; a first electrode having a first distal end; and a second electrode having a second distal end, wherein, the first electrode and the second electrode extend to a central volume of the sealed housing to determine a level of fuel within the sealed housing, and the sealed housing is symmetrically disposed about the central volume.

According to another aspect of the current invention, the sealed housing is symmetrically disposed about the central volume so that all volumetrically bisecting planes intersect at a central point.

According to another aspect of the current invention, the tank further includes a signal detector to detect the level of the conductive fuel, wherein the signal detector applies a weak current to the first and second electrodes to determine whether a circuit is completed by the conductive fuel.

According to another aspect of the current invention, a fuel cell system having a membrane electrode assembly is provided, including: a fuel tank; and a signal detector, wherein the fuel tank contains supplies a conductive fuel to the membrane electrode assembly, and comprises: a sealed housing; a first electrode having a first distal end; and a second electrode having a second distal end, wherein, the first electrode and the second electrode extend to a central volume of the sealed housing to determine a level of fuel within the sealed housing, and the sealed housing is symmetrically disposed about the central volume; wherein the signal detector applies a weak current to the first and second electrodes to determine whether a circuit is completed by the conductive fuel.

According to another aspect of the current invention, a tank to contain a conductive fuel for a fuel cell is provided, including: a sealed housing; a first electrode having a first distal end; and a second electrode having a second distal end, wherein, regardless of how the sealed housing is rotated, the conductive liquid electrically connects the first and second distal ends. According to another aspect of the current invention, the conductive liquid electrically connects the first and second distal ends when the conductive liquid fills about half of the sealed housing. And, a fuel cell system containing a fuel tank wherein, regardless of how the sealed housing is rotated, the conductive liquid electrically connects the first and second distal ends.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
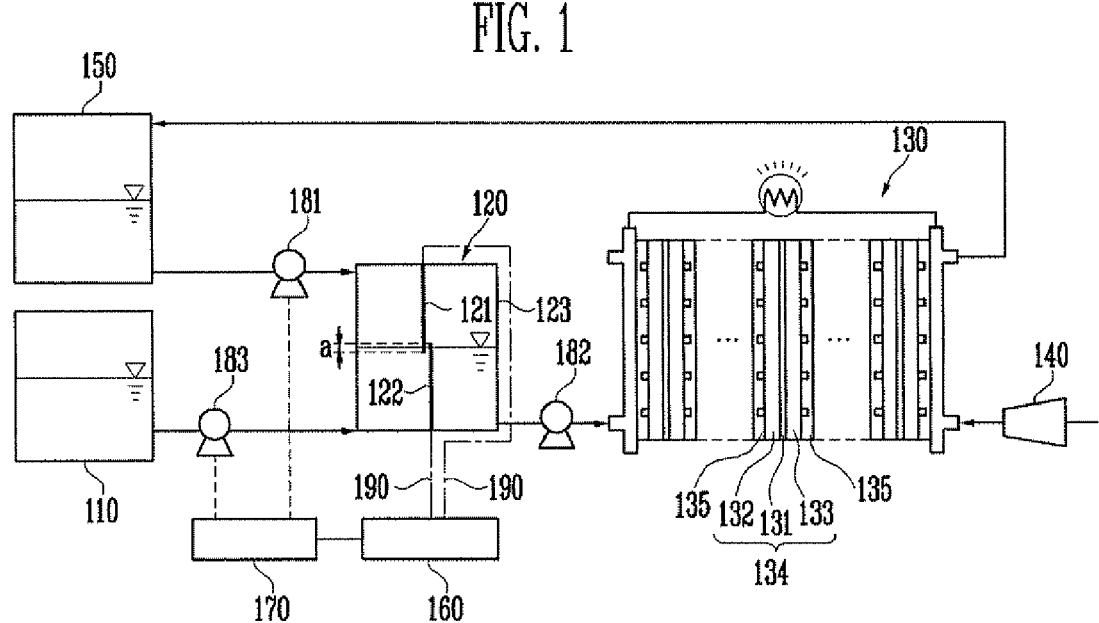
FIG. 1 is a schematic view showing a fuel cell system according to an embodiment of the present invention.

Reference will now be made in detail to aspects of the present invention, examples of which are illustrated in the accompanying drawings, wherein like reference numerals refer to the like elements throughout. Embodiments are described below in order to explain the present invention with reference to the figures.

Figure 2:
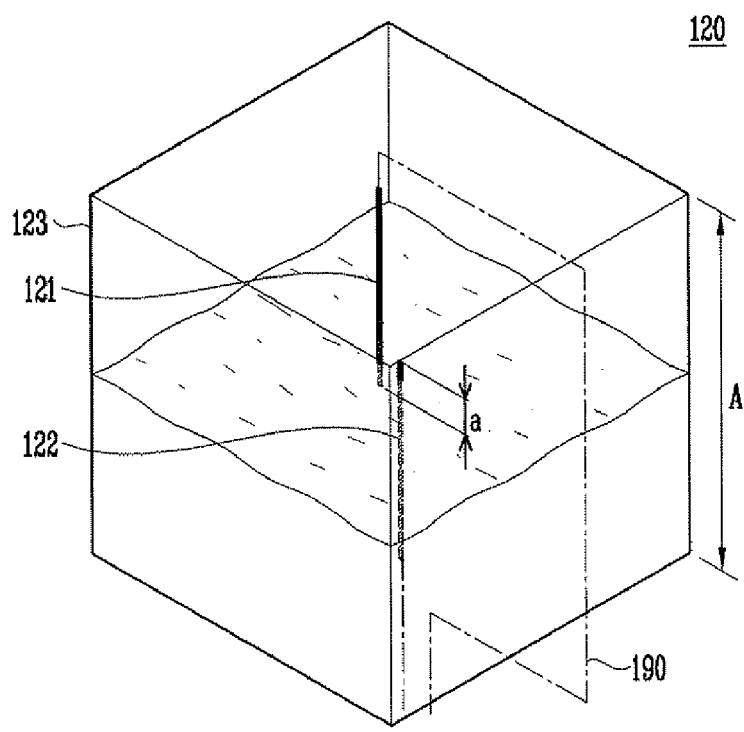
FIG. 2 is a perspective view showing a fuel mixer adopting a liquid tank according to an embodiment of the present invention.

FIG. 1 is a schematic view showing a fuel cell system according to aspects of the present invention, and FIG. 2 is a perspective view showing a fuel mixer 120 adopting a liquid tank according to aspects of the present invention.

Referring to FIG. 1, the fuel cell system includes a fuel vessel 110, a water tank 150, a fuel mixer 120, an fuel cell 130, pumps 181, 182, and 183, and an air supplier 140. The fuel mixer 120 is provided with a liquid level detection device, wherein the liquid level detection device is configured of electrodes 121 and 122 and a signal detector 160 electrically connected to the electrodes 121 and 122 by wires 190. The liquid detection device is electrically connected to a controller 170.

As the fuel cell system is a direct methanol fuel cell system, the water stored in the water tank 150 and the raw material fuel, generally highly concentrated methanol, stored in the fuel vessel 110 are supplied to the fuel mixer 120. The fuel mixer 120 mixes the raw material fuel and the water to generate a mixing fuel supplied to the fuel cell 130. The fuel cell 130 generates electric energy by electrochemically reacting the mixing fuel and oxygen supplied from the air supplier 140.

The fuel mixer 120 is supplied with the raw material fuel stored in the fuel vessel 110 by the pump 183 and supplied with the water stored in the water tank 150 by the pump 181. The fuel mixer 120 generates the mixing fuel from the raw material fuel and the water.

The housing 123 of the fuel mixer 120 is a sealed structure with a regular hexahedral shape, and the housing material is constructed from a non-conductive substance. However, the shape of the housing 123 is not limited thereto and may be a spherical or any 180° point symmetric shape with respect to a central volume of the housing 123, meaning that regardless of how the shape is volumetrically bisected, every bisecting plane includes the point about which the shape is symmetric. Or, the housing 123 may be formed such that the volumetrically bisecting planes form the central volume of the housing 123. The central volume is the most central volume of the housing 123 or the geometric center of the housing 123.

The electrodes 121 and 122 are straight, elongated cylinders, and the electrodes are generally the same length. The electrodes 121 and 122 extend to a central volume of the housing and have a length of about 50% to 60% of the height of a full level (A). The full level (A) is the height of the level of the liquid with respect to the bottom of the housing 123 when the liquid completely fills the housing 123. The electrodes 121 and 122 are installed to be normal to a usual liquid surface. The usual liquid surface is generally the configuration of the surface of the liquid contained in the housing 123 when the housing 123 is rigidly fixed. The electrodes 121 and 122 are arranged to be symmetric about a central volume in the housing 123, and the distal portions of the electrodes 121 and 122 are positioned in or near the central volume of the housing 123. The electrodes 121 and 122 are installed to be near each other in the central volume of the housing 123 such that the distal ends of the electrodes 121 and 122 are at a conductible interval when both are immersed in the conductible liquid, meaning that when the conductive liquid level is sufficiently high, the distal ends of the electrodes 121 and 122 are at a distance such that electrons may be transferred from one of the electrodes 121 and 122 to the other of the electrodes 121 and 122. A conduction level is when the conductive liquid fills the housing 123 to a level sufficient to electrically connect the electrodes 121 and 122. Each of the electrodes 121 and 122 extend from opposite sides of the housing 123, into the central volume, and the distal end of the electrode 121 extends past the distal end of the electrode 122 by a predetermined length (a). The two electrodes 121 and 122 overlap by the predetermined length (a). The predetermined length by which the electrodes 121 and 122 extend past each other is less than about 10% of the length of the distance between the height of the full level (A) and the bottom of the housing. The electrodes 121 and 122 may be configured differently. For example, the electrodes 121 and 122 may be arranged so that the two distal ends of the electrodes 121 and 122 extend past each other by a predetermined length (a) in a volume of the housing 123 that is only 10% below the level of the full level (A).

The electrodes 121 and 122 are connected to a signal detector 160 by wires 190. In particular, the wire 190 disposed on the upper part of the housing 123 can also be attached to the outer wall of the housing 123. The signal detector 160 is electrically connected to the controller 170, and the controller 170 is electrically connected to the pumps 181 and 183.

The fuel mixer 120 is constructed such that the signal detector 160 continuously supplies a weak current to the electrodes 121 and 122. The liquid in the housing 123 completes the circuit between the electrodes 121 and 122 and the signal detector 160. As the apparent liquid level in the housing 123 may fluctuate due to movement of the housing 123 and the fuel cell system, the controller 170 regulates the necessary changes in the system settings based on information gathered from the signal detector 160 over predetermined lengths of time. For example, if the signal detector 160 detects a completed circuit for a predetermined length of time, like ten seconds, the controller may respond by stopping the activity of the pumps 181 and 183. The signal detector 160 will detect a completed circuit when the liquid level is sufficient to connect and conduct current between the electrodes 121 and 122. However, if the signal detector 160 detects a shorted circuit for a predetermined length of time, the controller may respond by starting the operation of the pumps 181 and 183.

With specific reference to FIG. 2, when the liquid level in the fuel mixer 120 decreases below a set point, for example, 50% of the full level (A), the electrode 121 is exposed and no longer extended into the liquid. The circuit between the electrodes 121 and 122 and the signal detector 160 is broken, and, if the signal detector 160 detects such a short circuit for a predetermined length of time, the controller 170 may respond by starting the operation of the pumps 181 and 183. The electrodes 121 and 122 are electrically connected to the signal detector 160 by the wires 190.

As the shape of the housing 123 is symmetric about a central volume, the electrodes 121 and 122 can continuously indicate that the level of the liquid in the housing 123 is greater than or less than about 50% of the full level (A), even when the housing 123 is rotated. That is, when the liquid level inside the housing 123 is greater than about 50% of the full level (A), the electrodes remain electrically connected and the circuit between the electrodes 121 and 122 and the signal detector 160 remains closed. However, when the level of the liquid in the housing 123 decreases to below about 50% of the full level (A), the connection between the electrodes 121 and 122 is broken, and the circuit between the electrodes 121 and 122 and the signal detector 160 is shorted. The completion or shorting of the circuit is dependent on the liquid level in the housing 123 but is independent of the direction in which the housing 123 is positioned. The signal detector 160 can detect a switching of the circuit from completed to shorted and shorted to completed. Therefore, even when the fuel mixer 120 is rotated, the level of the liquid inside the fuel mixer 120 can be sensed.

The fuel cell 130 generates electric energy by electrochemically reacting the mixing fuel supplied from the fuel mixer 120 with the oxygen supplied through the air supplier 140. The fuel cell 130 may include, as at least one unit fuel cell to generate electric energy, a membrane electrode assembly (MEA) 134 to oxidize and reduce the fuel and oxygen, respectively, and a bipolar plate 135 to supply the mixing fuel and oxygen to the MEA 134 and discharge products from the MEA 134. The MEA 134 may have a structure of a usual MEA including an electrolyte membrane 131 interposed between an anode 132 and a cathode 133. Also, the fuel cell 130 may have a stack structure such that a plurality of fuel cell units are stacked The mixing fuel is supplied to the anode 132 through the bipolar plate 135 adjacent to the anode 132. Further, the oxygen is supplied to the cathode 133 through another bipolar plate 135 adjacent to the cathode 133. Also, the products generated from the anode 132 and the cathode 133 are discharged through the adjacent bipolar plates 135.

The electrochemical reaction equation of the fuel cell 130 is represented as the following Reaction Equation 1:

Anode reaction: $CH_3OH+H_2O \rightarrow CO_2+6H^++6e^-$

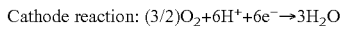

Cathode reaction: $(3/2)O_2+6H^++6e^- \rightarrow 3H_2O$

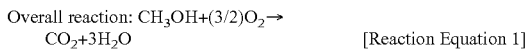

Overall reaction: $CH_3OH+(3/2)O_2 \rightarrow CO_2+3H_2O$  [Reaction Equation 1]

Referring to the anode reaction of Reaction Equation 1, the mixing fuel generates carbon dioxide, hydrogen ions, and electrons at the anode 132. The hydrogen ions generated at the anode 132 pass through the electrolyte film 131 and move to the cathode 133. The electrons generated from the anode 132 move through an external circuit to the cathode 133 as the electrolyte film 131 selectively allows only the positive hydrogen ions to pass. In the cathode reaction of Reaction Equation 1, the hydrogen ions combine with oxygen and the previously-removed electrons at the cathode 133 to generate water.

The water generated from the fuel cell 130 is recycled to the water tank 150 to be supplied to the fuel mixer 120 as described above.

Figure 3:
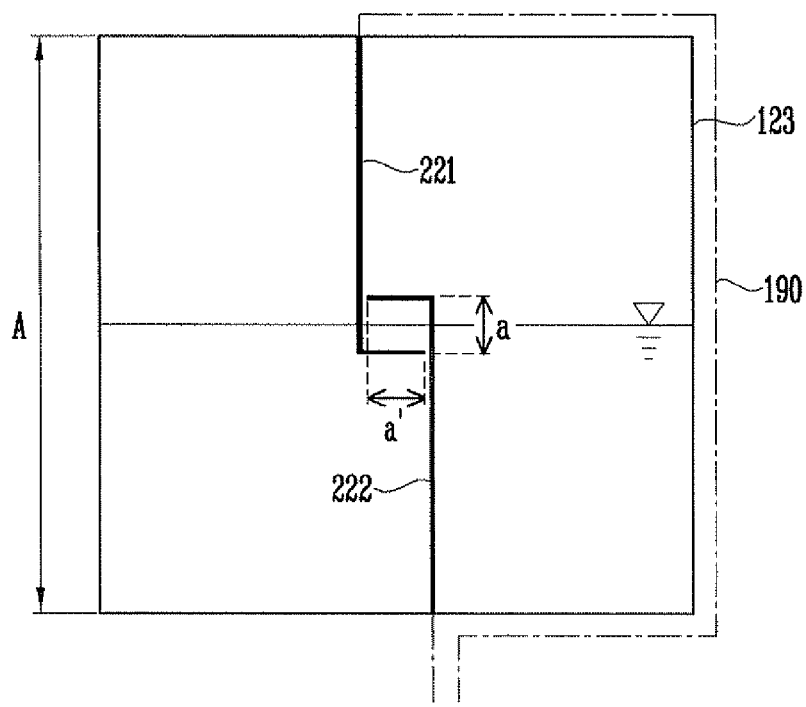
FIG. 3 is a cross-sectional view showing a fuel mixer adopting a liquid tank according to an aspect of the present invention.

FIG. 3 a cross-sectional view showing a fuel mixer 220 adopting a liquid tank according to aspects of another embodiment of the present invention.

The construction of the fuel mixer 220 is similar to that of the fuel mixer 120 as described above. However, the distal portions of the electrodes 221 and 222 are bent at 90° angles toward the other of the electrodes 221 and 222. That is, the distal ends of the electrodes 221 and 222, first, extend past each other by a predetermined length (a). Then, the distal ends of the electrodes are bent at 90° angles toward each other and extend for a predetermined length (a'). The overlapping portions are positioned in or near a central volume of the housing 123 and the predetermined length (a) is less than about 10% of the full level (A), or less than about 10% of the distance of the height of the full level (A) with respect to the bottom of the housing 123. Predetermined length (a'), the length by which the distal ends of the electrodes 221 and 222 overlap, is similar to the predetermined length (a). Therefore, if the level of the liquid contained in the housing 123 of the fuel mixer 220 is about 50% of the full level (A), the liquid can complete the circuit between the electrodes 221 and 222 and the signal detector 160 (not shown), even when the fuel mixer 220 is rotated as in a usual operation of the fuel cell system. The other operations of the fuel mixer 220 are the same as the operations of the fuel mixer 120 as described above.

Figure 4:
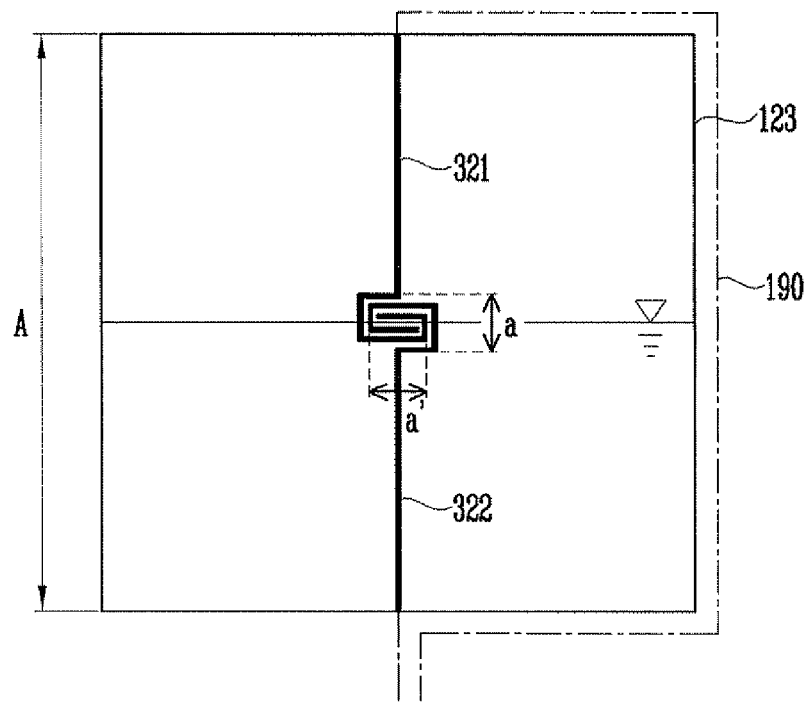
FIG. 4 is a cross-sectional view showing a fuel mixer adopting a liquid tank according to another aspect of the present invention.

FIG. 4 is a cross-sectional view showing a fuel mixer 320 adopting a liquid tank according to another aspect of the present invention.

The construction of the fuel mixer 320 is similar to that of the fuel mixer 120 as described above. However, the distal portions of the electrodes 321 and 322 extend and bend with each other to form a rectangular spiral. Other configurations of the electrodes 321 and 322 are available, such as a smooth spiral or a three-dimensional spiral. Also, an increased number of rotations is achievable. The spiral shape is formed as the distal ends of the electrodes 321 and 322 extend past each other by a predetermined length (a) and return. The spiral extends to a width of predetermined length (a'). The overlapped portions are positioned in or near a central volume of the housing 123. Specifically as illustrated in FIG. 4, the electrodes 321 and 322 extend in first directions toward each other from opposite sides of the housing 123 and then bend oppositely outward at 90° angles away from the central volume of the housing 123. The distal ends of the electrodes 321 and 322 then turn 90° back to extend further in the first directions and extend past each other. The distal ends then turn 90° toward each other and extend inwardly past each other again. The distal ends of the electrodes 321 and 322 then turn 90° to extend a shorter distance in a second direction (opposite the first direction) and extend past each other again. Finally, the distal ends of the electrodes 321 and 322 turn 90° inward and extend towards each other and past each other. The predetermined length (a) is less than about 10% of the full level (A), meaning that the predetermined length (a) is a length equal to less than about 10% of the distance between the surface of the liquid at full level (A) and the bottom of the housing 123. The length (a') is similar to the predetermined length (a). If the level of the surface of the liquid contained in the housing 123 of the fuel mixer 320 is about 50% of the full level (A), the liquid can complete the circuit between the electrodes 321 and 322 and the signal detector 160 (not shown), even when the fuel cell system and fuel mixer 320 are rotated as in a normal operation. Furthermore, the configuration of the electrodes 321 and 322 allows for better response to quickly fluctuating liquid levels within the housing 123 such that the fluctuating liquid level results in fewer disconnections of the circuit and more stable signal detection by the signal detector 160 (not shown). The operations of the fuel mixer 320 are the same as the operations of the fuel mixer 120 as described above.

Figure 5:
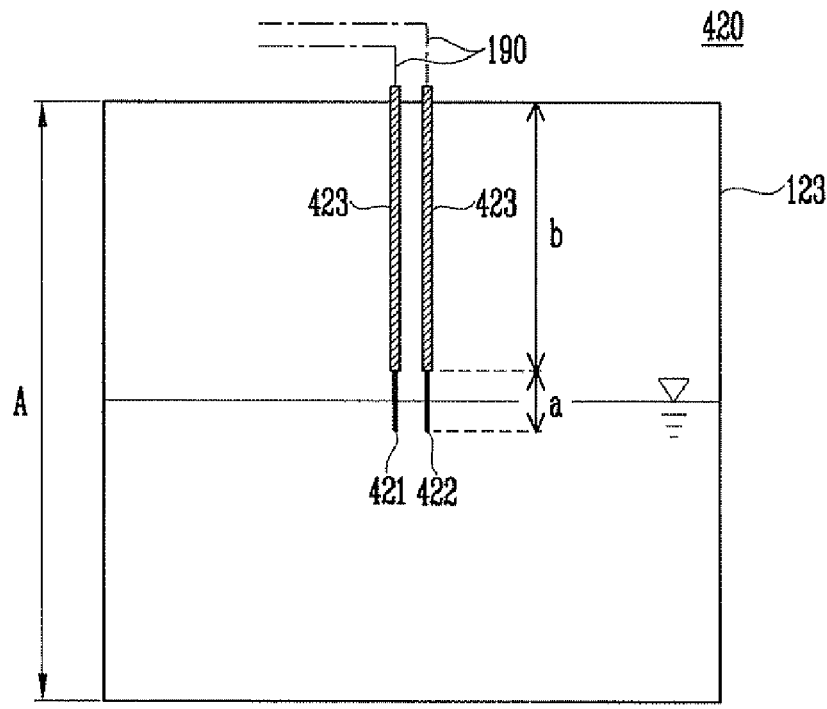
FIG. 5 is a cross-sectional view showing a fuel mixer adopting a liquid tank according to another aspect of the present invention.

FIG. 5 is a cross-sectional view showing a fuel mixer 420 adopting a liquid tank according to another aspect of the present invention.

The construction of the fuel mixer 420 is similar to that of the fuel mixer 120 as described above. However, the electrodes 421 and 422 are installed to extend in the same direction from the same side of the housing 123 and are enclosed within an insulator 423. The lengths of the electrodes 421 and 422 are about 50% to 60% of the height of the surface of a liquid contained in the housing 123 at full level (A), the height determined as the length of the distance between the surface of the liquid at full level (A) and the bottom of the housing 123. The electrodes 421 and 422 are covered with an insulator 423, which extends and covers most of the length of the electrodes 421 and 422 leaving a portion at the distal end of the electrodes 421 and 422 exposed. The insulator 423 covers the electrodes 421 and 422 for a predetermined length (b), which is a length of about 40% to 50% of the length of the distance between the full level (A) and the bottom of the housing 123. The electrodes 421 and 422 are exposed for a predetermined length (a), which is less than about 10% of the length of the distance between the full level (A) and the bottom of the housing 123. The electrodes 421 and 422 extend such that the exposed distal ends of the electrodes are disposed in or near a central volume of the housing 123.

The fuel mixer 420 performs the same operations as the fuel mixer 120 as described above despite the electrodes 421 and 422 being installed in the same direction. The electrodes 421 and 422 are easily and simultaneously manufactured and installed.

Figure 6:
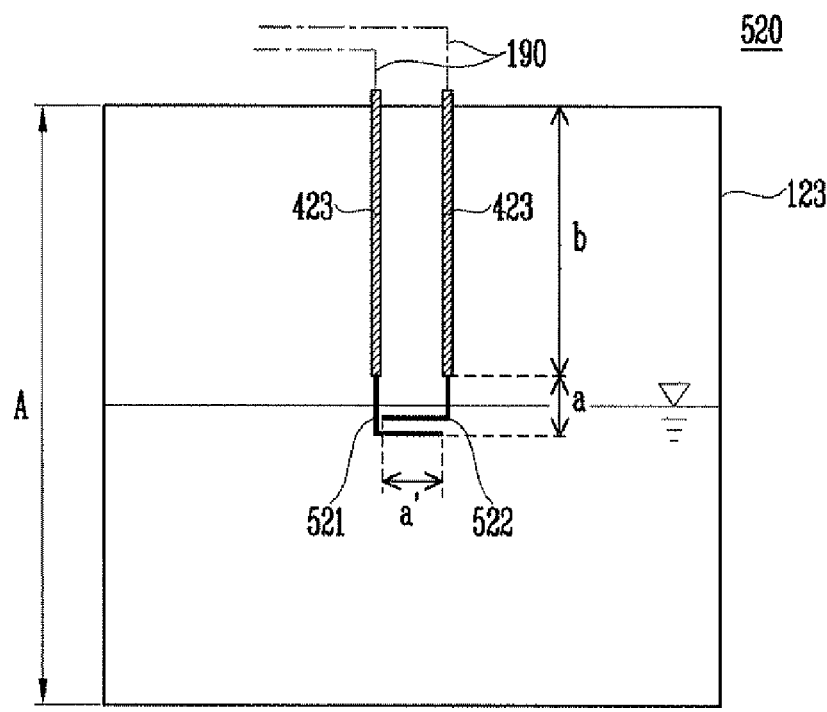
FIG. 6 is a cross-sectional view showing a fuel mixer adopting a liquid tank according to another aspect of the present invention.

FIG. 6 is a cross-sectional view showing a fuel mixer 520 adopting a liquid tank according to another aspect of the present invention.

The construction of the fuel mixer 520 is similar to that of the fuel mixer 220 as described above. However, the electrodes 521 and 522 are installed to extend in the same direction from the same side of the housing 123 and are enclosed with an insulator 423. The electrodes 521 and 522 extend for a length equal to about 50% to 60% of the height of the full level (A), meaning a length of about 50% to 60% of the distance between the surface of a liquid contained in the housing 123 at the full level (A) and the bottom of the housing 123. The insulator 423 covers the electrodes 521 and 522 for a predetermined length (b), which is a length of about 40% to 50% of the length of the distance between the full level (A) and the bottom of the housing 123. Such predetermined length (b) of the insulator leaves the distal ends of the electrodes 521 and 522 exposed to the liquid contained in the housing. The exposed distal ends of the electrodes 521 and 522 are bent at 90° angles toward the other of the electrodes 521 and 522. That is, the exposed distal ends of the electrodes 521 and 522, first, extend parallel to each other. Then, specifically as illustrated, the electrode 522 bends toward the electrode 521 first at a length of extension less than predetermined length (a). The electrode 521 extends the full predetermined length (a) then bends 90° toward the electrode 522. The distal ends of the electrodes 521 and 522 overlap for a distance equal to the predetermined length (a'). The overlapping portions are positioned in or near a central volume of the housing 123. The predetermined length (a) is less than about 10% of the full level (A), or less than about 10% of the distance equal to the height of full level (A) with respect to the bottom of the housing 123. Predetermined length (a'), the length by which the distal ends of the electrodes 521 and 522 overlap, is similar to the predetermined length (a).

The fuel mixer 520 performs the same operations as the fuel mixer 220 as described above despite the electrodes 521 and 522 being installed to extend in the same direction from the same side of the housing. The fuel mixer 520 is easily manufactured, and the electrodes 521 and 522 can be easily and simultaneously manufactured and installed. The other operations of the fuel mixer 520 are the same as the operations of the fuel mixer 220 as described above.

Figure 7:
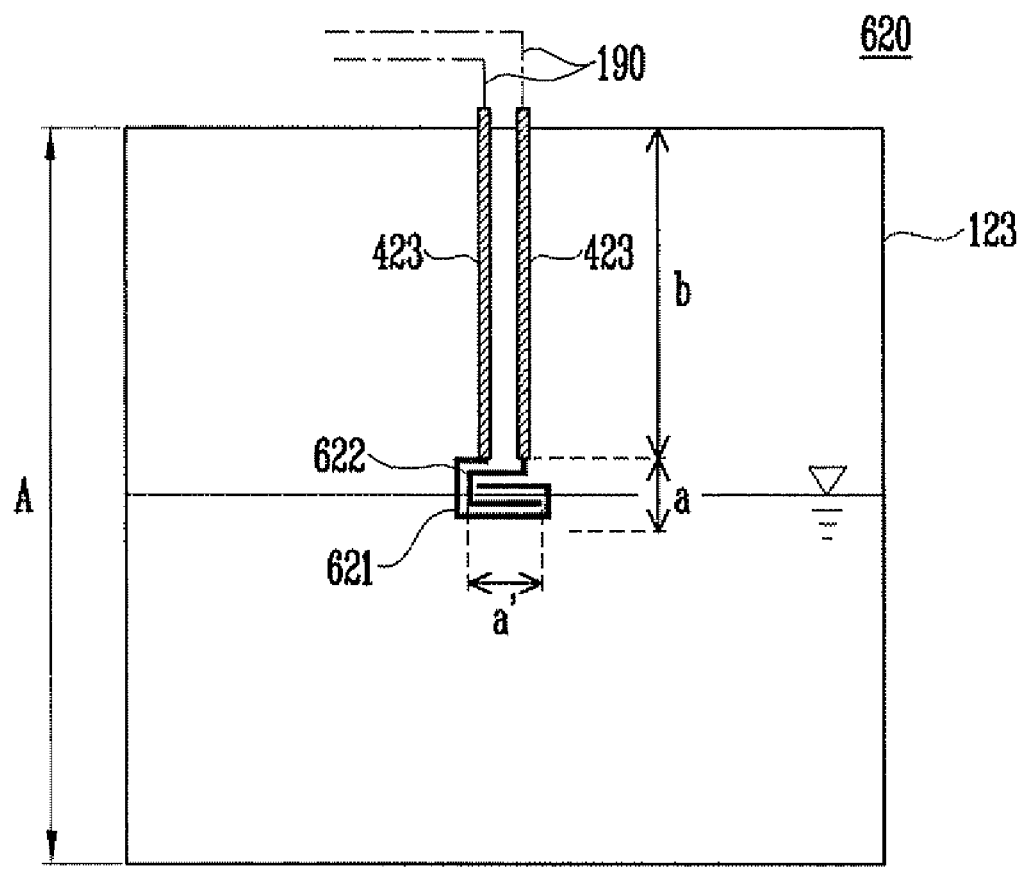
FIG. 7 is a cross-sectional view showing a fuel mixer adopting a liquid tank according to another aspect of the present invention.

FIG. 7 is a cross-sectional view showing a fuel mixer 620 adopting a liquid tank according to another aspect of the present invention.

The construction of the fuel mixer 620 is similar to that of the fuel mixer 320 as described above. However, the electrodes 621 and 622 are installed in the same direction and are enclosed with an insulator 423. The electrodes 621 and 622 extend in a first direction for a length equal to about 50% to 60% of the height of the full level (A), meaning about 50% to 60% of the distance between the surface of a liquid contained in the housing 123 at the full level (A) and the bottom of the housing 123. The insulator 423 covers the electrodes 621 and 622 for a predetermined length (b), which is a length of about 40% to 50% of the length of the distance between the full level (A) and the bottom of the housing 123. Such predetermined length (b) of the insulator leaves the distal ends of the electrodes 621 and 622 exposed to the liquid contained in the housing. The distal ends of the electrodes 621 and 622, specifically as illustrated, form a rectangular spiral in a central volume of the housing 123. The distal ends of the electrodes 621 and 622 both bend 90° in the same direction to extend in a second direction and then bend 90° back to the first direction to extend further. The electrodes then bend 90° to and extend in a third direction, which is opposite to the second direction. The electrode 622 then terminates while the electrode 621 continues and bends 90° to and extends in a fourth direction, opposite to the first direction. Finally, the electrode 621 bends 90° to and extends in the second direction again. The exposed distal ends of the electrodes 621 and 622 overlap for a predetermined length (a) in the first-fourth direction and overlap for a predetermined length (a') in the second-third direction. The predetermined lengths (a) and (a') are of generally similar lengths and are less than about 10% of the length of the height of the full level (A). Or, the predetermined lengths (a) and (a') are less than about 10% of the distance between the surface of the liquid contained in the housing 123 at full level (A) and the bottom of the housing 123.

The fuel mixer 620 performs in the same manner as the fuel mixer 320 described above despite the electrodes 621 and 622 being installed to extend in the same direction from the same side of the housing. The fuel mixer 620 is easily manufactured, and the electrodes 621 and 622 can be easily and simultaneously manufactured and installed. The other operations of the fuel mixer 620 are the same as the operations of the fuel mixer 320 as described above.

Other embodiments of the teachings herein disclosed are easily discernible. For example, the locations in the housing from which the electrodes extend may be changed. The electrodes may be flat, plate-like electrodes as opposed to cylindrical. The housing 123 may act as an electrode such that only one electrode extends into the housing. The spirals in which the distal ends of the electrodes may be smooth, rectangular, or any other shape. The electrodes could a form helical structure. Or, the electrodes could line the housing at a predetermined distance to indicate fuel levels other than about 50% of the full level.

While the above-described examples applying different aspects of a liquid tank to a fuel mixer of a direct methanol fuel cell system, the present aspects are not limited thereto. That is, the present embodiments can be applied to other devices detecting a liquid level in a liquid tank; for example, a fuel mixer in various fuel cell systems, a water tank, or any tank storing a conductive fuel, etc.

A fuel cell adopting a liquid tank according to aspects of the present invention can be easily manufactured and maintains the liquid level in the liquid tank near about 50% full when the tank is rotated so that the system is continuously operable despite rotations.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A liquid tank in a fuel cell system using a conductive liquid, comprising:
    an airtight vessel to contain the conductive liquid; and
    at least two electrodes installed inside the airtight vessel, distal ends of the electrodes being positioned at a central region of the airtight vessel, and
    each of the electrodes having a first portion that overlaps another one of the electrodes in a first direction and a second portion that overlaps the another one of the electrodes in a second direction perpendicular to the first direction, the second portion being different from the first portion.

2. The liquid tank of claim 1, wherein the airtight vessel has a 180° point symmetric shape with respect to the central region of the airtight vessel.

3. The liquid tank of claim 2, wherein the electrodes are installed symmetrically about the central region of the airtight vessel and at conductible intervals when simultaneously immersed in the liquid.

4. The liquid tank of claim 3, wherein the electrodes have a same length, and at least a portion of the distal ends of the electrodes overlap.

5. The liquid tank of claim 4, wherein the overlapped portion of the electrodes is between a highest liquid level and a lowest liquid level in the airtight vessel.

6. The liquid tank of claim 1, wherein the electrodes are installed to extend in the first direction, and the first direction is normal to the surface of the liquid stored in the airtight vessel.

7. The liquid tank of claim 6, wherein a length in which the distal ends of the electrodes overlap is less than about 10% of a height of a full level of the airtight vessel.

8. The liquid tank of claim 7, wherein lengths of the electrodes are about 50% to 60% of the height of the full level of the airtight vessel.

9. The liquid tank of claim 7, wherein the electrodes are bent at 90° toward each other so at least a portion of the electrodes overlap, and vertical lengths of the electrodes are about 50% to 60% of the height of the full level of the airtight vessel.

10. The liquid tank of claim 7, wherein the distal ends of the electrodes are curved in a spiral shape with each other so at least a portion of the distal ends overlap and lengths of the electrodes in the first direction are about 50% to 60% of the height of the full level of the airtight vessel.

11. The liquid tank of claim 2, wherein each of the electrodes is provided with an insulator to cover the electrodes except for exposed portions at the distal ends of the electrodes.

12. The liquid tank of claim 11, wherein lengths of the insulators installed on the electrodes are about 40% to 50% or less of a height of a full level of the airtight vessel.

13. The liquid tank of claim 12, wherein the electrodes are installed to extend in a same direction from a same side of the airtight vessel and the exposed portions of the electrodes are at conductible intervals when simultaneously immersed into the liquid.

14. The liquid tank of claim 13, wherein lengths of the electrodes are the same, and at least a portion of the exposed portions overlap.

15. The liquid tank of claim 14, wherein the overlapped portion of the exposed portions of the electrodes are between a highest liquid level and a lowest liquid level in the airtight vessel.

16. The liquid tank of claim 11, wherein the electrodes are installed in the first direction, and the first direction is normal to the surface of the liquid stored in the airtight vessel.

17. The liquid tank of claim 16, wherein a length in which the exposed portions of the distal ends of the electrodes overlap is less than about 10% of a height of a full level of the airtight vessel.

18. The liquid tank of claim 17, wherein lengths of the electrodes in the first direction are about 50% to 60% of the height of the full level of the airtight vessel.

19. The liquid tank of claim 17, wherein the exposed portions of the electrodes are bent at 90° toward each other so at least a portion of the exposed portions overlap, and vertical lengths of the electrodes are about 50% to 60% of the height of the full level of the airtight vessel.

20. The liquid tank of claim 17, wherein the exposed portions of the electrodes are curved in a spiral shape with each other so at least a portion of the exposed portions overlap and lengths of the electrodes in the first direction are about 50% to 60% of the height of the full level of the airtight vessel.

21. The liquid tank of claim 1, wherein the airtight vessel includes a signal detector to supply electricity to the electrodes and to detect a switching of the electrodes.

* * * * *